United States Patent
Sharma et al.

(10) Patent No.: US 10,382,674 B2
(45) Date of Patent: Aug. 13, 2019

(54) REFERENCE IMAGE SELECTION FOR MOTION GHOST FILTERING

(71) Applicant: QUALCOMM Incorporated, San Diego, CA (US)

(72) Inventors: Piyush Sharma, Stanford, CA (US); Nitesh Shroff, San Diego, CA (US); Ramin Rezaiifar, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 14/012,518

(22) Filed: Aug. 28, 2013

(65) Prior Publication Data

US 2014/0307044 A1 Oct. 16, 2014

Related U.S. Application Data

(60) Provisional application No. 61/812,148, filed on Apr. 15, 2013, provisional application No. 61/812,151, filed on Apr. 15, 2013.

(51) Int. Cl.
*H04N 7/00* (2011.01)
*H04N 5/232* (2006.01)
(Continued)

(52) U.S. Cl.
CPC ......... *H04N 5/23229* (2013.01); *G06T 5/007* (2013.01); *G06T 5/50* (2013.01);
(Continued)

(58) Field of Classification Search
CPC ..... G06T 5/007; H04N 5/23229; H04N 5/217
(Continued)

(56) References Cited

U.S. PATENT DOCUMENTS

2009/0274387 A1* 11/2009 Jin ................ G03B 7/00
382/274
2011/0007185 A1 1/2011 Yonaha et al.
(Continued)

FOREIGN PATENT DOCUMENTS

CN 102905058 A 1/2013
JP 2006270238 A 10/2006
(Continued)

OTHER PUBLICATIONS

Jacobs K ., et al., "Automatic HDRI generation of dynamic environments", International Conference on Computer Graphics and Interactive Techniques Archive ACM SIGGRAPH 2005 Sketches, ACM New York, NY, US, No. 43, Jul. 31, 2005 (Jul. 31, 2005), p. 1, XP002562044, section 3, par. "HDRI generation".
(Continued)

*Primary Examiner* — Jamie J Atala
*Assistant Examiner* — Masum Billah
(74) *Attorney, Agent, or Firm* — Silicon Valley Patent Group LLP

(57) ABSTRACT

Exemplary methods, apparatuses, and systems for image processing are described. One or more reference images are selected based on image quality scores. At least a portion of each reference image is merged to create an output image. An output image with motion artifacts is compared to a target to correct the motion artifacts of the output image.

35 Claims, 12 Drawing Sheets

```
RECEIVE AN OUTPUT IMAGE MERGED FROM A PLURALITY
OF UNIQUE INPUT IMAGES, THE OUTPUT IMAGE HAVING A
FIRST GHOSTY COMPONENT CONTAINING MOTION
ARTIFACTS RESULTING FROM THE MERGE OF THE
PLURALITY OF UNIQUE INPUT IMAGES
705
              │
              ▼
COMPARE THE FIRST GHOSTY COMPONENT TO A TARGET
COMPONENT WITHIN EACH OF THE PLURALITY OF UNIQUE
INPUT IMAGES, THE TARGET COMPONENT
ENCOMPASSING A SAME RELATIVE IMAGE AREA COVERED
BY THE FIRST GHOSTY COMPONENT
710
              │
              ▼
SELECT A FIRST REFERENCE IMAGE FROM THE PLURALITY
OF UNIQUE INPUT IMAGES BASED ON THE COMPARING
THE FIRST GHOSTY COMPONENT TO THE TARGET
COMPONENT WITHIN EACH OF THE PLURALITY OF UNIQUE
INPUT IMAGES
715
              │
              ▼
CORRECTING THE FIRST GHOSTY COMPONENT BY
REPLACING AT LEAST A PORTION OF THE FIRST GHOSTY
COMPONENT OF THE OUTPUT IMAGE WITH AT LEAST A
PORTION OF THE FIRST REFERENCE IMAGE
720
```

(51) Int. Cl.
*G06T 5/00* (2006.01)
*G06T 5/50* (2006.01)
*H04N 5/235* (2006.01)

(52) U.S. Cl.
CPC ............... *G06T 2207/10144* (2013.01); *G06T 2207/20208* (2013.01); *G06T 2207/20212* (2013.01); *H04N 5/2355* (2013.01); *H04N 5/23238* (2013.01)

(58) Field of Classification Search
USPC ......................................... 348/36, 46, 218.1
See application file for complete search history.

(56) References Cited

U.S. PATENT DOCUMENTS

| | | |
|---|---|---|
| 2011/0058050 A1 | 3/2011 | Lasang et al. |
| 2011/0069906 A1 | 3/2011 | Park et al. |
| 2011/0176024 A1* | 7/2011 | Kwon ................ H04N 5/23232 348/222.1 |
| 2011/0211732 A1* | 9/2011 | Rapaport .............. G06F 3/1454 382/107 |
| 2012/0038793 A1 | 2/2012 | Shimizu et al. |
| 2012/0200744 A1 | 8/2012 | Matsuoka |
| 2012/0288217 A1 | 11/2012 | Zhai et al. |
| 2012/0293685 A1 | 11/2012 | Garten |
| 2013/0028509 A1* | 1/2013 | Moon .................. H04N 5/2355 382/162 |
| 2013/0136364 A1* | 5/2013 | Kobayashi .............. G06T 5/009 382/195 |
| 2013/0287296 A1 | 10/2013 | Li et al. |
| 2014/0307960 A1 | 10/2014 | Sharma et al. |

FOREIGN PATENT DOCUMENTS

| | | |
|---|---|---|
| JP | 2011188277 A | 9/2011 |
| JP | 2011525058 A | 9/2011 |
| JP | 2011205422 A | 10/2011 |
| JP | 2011205442 A | 10/2011 |
| JP | 2012029045 A | 2/2012 |
| JP | 2013031174 A | 2/2013 |
| KR | 1020060035513 * | 7/2006 |
| KR | 20090089071 A | 8/2009 |
| KR | 20100040651 A | 4/2010 |
| WO | 2012015359 A1 | 2/2012 |

OTHER PUBLICATIONS

Khan E.A., et al., "Ghost Removal in High Dynamic Range Images", Image Processing, 2006 IEEE International Conference on, IEEE, PI, Oct. 1, 2006 (Oct. 1, 2006), pp. 2005-2008, XP031049059, ISBN: 978-1-4244-0480-3.

Moon Y.S., et al., "A simple ghost-free exposure fusion for embedded HDR imaging", Consumer Electronics (ICCE), 2012 IEEE International Conference on, IEEE, Jan. 13, 2012 (Jan. 13, 2012), pp. 9-10, XP032124742, DOI:10.1109/ICCE.2012.6161713, ISBN: 978-1-4577-0230-3.

Partial International Search Report—PCT/US2014/031354—ISA/EPO—Jul. 31, 2014.

Sen P. et al., "Robust patch-based hdr reconstruction of dynamic scenes", ACM Transactions on Graphics, vol. 31, No. 6, Nov. 1, 2012 (Nov. 1, 2012), p. 1, XP055101420, ISSN : 0730-0301, DOI: 10.1145/2366145.2366222.

Sidibe B., et al., "Ghost Detection and Removal in High Dynamic Range Images", Proceedings EUSIPCO, Aug. 25, 2009 (Aug. 25, 2009), pp. 1-5, XP055101428, Glasgow, United Kingdom section 2.3.

Silk S., et al., "Fast high dynamic range image deghosting for arbitrary scene motion", May 28, 2012, May 28, 2012-May 30, 2012, May 28, 2012 (May 28, 2012), pp. 85-92, XP058009887, ISBN: 978-1-4503-1420-6 section 4.1.

Srikantha A., et al., "Ghost detection and removal for high dynamic range images : Recent advances", Signal Processing: Image Communication, vol . 27, No. 6, Jul. 1, 2012 (Jul. 1, 2012), pp. 650-662, XP055036838, ISSN: 0923-5965, DOI: 10 . 1016/j . image .2012. 02.001 the whole document.

Tico., M., "Motion-blur-free exposure fusion," 2010 17th IEEE International Conference on Image Processing (ICIP), Hong Kong, pp. 3321-3324, Sep. 26-29, 2010.

Im J., et al., "Ghost-Free High Dynamic Range Imaging Using Layered Exposed Images Based on Local Histogram Equalization," Proceedings of the SPIE, vol. 8399, article id. 83990I, 2012, 7 pages.

International Search Report and Written Opinion—PCT/US2014/031354—ISA/EPO—Nov. 3, 2014.

Silk S., et al. "High Dynamic Range Panoramic Imaging With Scene Motion", 2011.

* cited by examiner

REFERENCE IMAGE SELECTION FOR MOTION GHOST FILTERING

CROSS-REFERENCE TO RELATED APPLICATIONS

This application claims the benefit of and priority from U.S. Provisional Patent Application Ser. No. 61/812,148 filed on Apr. 15, 2013, titled "Reference image selection for motion ghost filtering" by first named inventor P. Sharma with Qualcomm Ref. 131825P1. This application also claims the benefit of and priority from U.S. Provisional Patent Application Ser. No. 61/812,151 filed on Apr. 15, 2013, titled "Generation of ghost-free high dynamic range images" by first named inventor P. Sharma with Qualcomm Ref. 131826P1, which is related to U.S. patent application Ser. No. 14/012,534 filed on Aug. 28, 2013, titled "Generation of ghost-free high dynamic range images" by first named inventor P. Sharma with Qualcomm Ref. 131826. All three applications are herein incorporated by reference.

BACKGROUND

I. Field of the Invention

The subject matter disclosed herein relates generally to image processing.

II. Background

The creation of digital images is often constrained by inherent hardware limitations of the camera, lens and sensor. For example, a camera sensor may have a limited luminance dynamic range due to the small form factor of the sensor or the cost to produce a more extended dynamic range sensor. However, while the limits of many camera sensors is about two orders of magnitude, the dynamic range of real world scenes may be up to ten orders of magnitude. Being attached to an inexpensive or small fixed focal length lens that may not provide a wide angle of view, or may not be able to capture an entire scene in focus further hampers output image quality from digital cameras.

However, digital cameras are increasingly becoming integrated with relatively powerful processors (e.g., when integrated with a smartphone, or professional digital camera). Integration with a powerful processor can extend previously limited hardware to new capabilities. For example, as a result of the limited dynamic range offered in many camera sensors and newly available improved image processing capabilities, High Dynamic Range (HDR) image generation can be used to greatly increase the dynamic range of an output image. HDR combines multiple Low Dynamic Range (LDR) images captured with different exposure settings (e.g., by changing shutter speed while keeping the aperture the same, or by changing the sensor gain—ISO, or a combination of one or more exposure settings). For example, one image may be captured with a half second exposure, a second image at a one second exposure, and a third image at three seconds of exposure. In another example, a first image may be captured at ISO 100 (or equivalent sensitivity), a second image may be captured at ISO 200, and a third image may be captured at ISO 400. The three images with varied exposure settings can be combined using the properly exposed sections from each of the images to create a final output image.

A limitation of existing techniques that combine multiple input images to create a merged output image is the potential for ghost/ghosty artifacts, or "ghosting" in the final output image when a moving object is in the input image. Because moving objects are commonly present in real world image capture situations, improved multiple image processing techniques are desirable.

BRIEF SUMMARY

Embodiments disclosed herein may relate to a method for image processing. The method includes determining an image quality score for each component within each of a plurality of unique images. The method further includes selecting a first reference image from the plurality of unique input images based on a first respective image quality score of a first component associated with the first reference image. The method further includes creating an output image based on a merging of the plurality of images, where the output image includes at least a portion of each reference image associated with each component.

Embodiments disclosed herein may relate to a machine readable non-transitory storage medium with instructions to perform image processing. The medium includes instructions for determining an image quality score for each component within each of a plurality of unique images. The medium further includes instructions for selecting a first reference image from the plurality of unique input images based on a first respective image quality score of a first component associated with the first reference image. The medium further includes instructions for creating an output image based on a merging of the plurality of images, where the output image includes at least a portion of each reference image associated with each component.

Embodiments disclosed herein may also relate to an apparatus to perform image processing that includes means for determining an image quality score for each component within each of a plurality of unique images. The apparatus further includes means for selecting a first reference image from the plurality of unique input images based on a first respective image quality score of a first component associated with the first reference image. The apparatus further includes means for creating an output image based on a merging of the plurality of images, where the output image includes at least a portion of each reference image associated with each component.

Embodiments disclosed herein may further relate to a data processing system including a processor and a storage device configurable to store instructions to perform image processing. The instructions cause the processor to determine an image quality score for each component within each of a plurality of unique images. The instructions cause the processor to select a first reference image from the plurality of unique input images based on a first respective image quality score of a first component associated with the first reference image. The instructions cause the processor to create an output image based on a merging of the plurality of images, where the output image includes at least a portion of each reference image associated with each component.

Embodiments disclosed herein may relate to a method for image processing. The method includes receiving an output image merged from a plurality of unique input images, the output image having a first ghosty component containing motion artifacts resulting from the merge of the plurality of unique input images. The method further includes comparing the first ghosty component to a target component within each of the plurality of unique input images, the target component encompassing a same relative image area covered by the first ghosty component. The method further includes selecting a first reference image from the plurality of unique images based on the comparing the first ghosty component to the target component within each of the plurality of unique input images. The method further includes correcting the first ghosty component by replacing at least a portion of the first ghosty component of the output image with at least a portion of the first reference image.

Embodiments disclosed herein may relate to a machine readable non-transitory storage medium with instructions to perform image processing. The medium includes instructions for receiving an output image merged from a plurality of unique input images, the output image having a first ghosty component containing motion artifacts resulting from the merge of the plurality of unique input images. The medium includes instructions for comparing the first ghosty component to a target component within each of the plurality of unique input images, the target component encompassing a same relative image area covered by the first ghosty component. The medium includes instructions for selecting a first reference image from the plurality of unique images based on the comparing the first ghosty component to the target component within each of the plurality of unique input images. The medium includes instructions for correcting the first ghosty component by replacing at least a portion of the first ghosty component of the output image with at least a portion of the first reference image.

Embodiments disclosed herein may also relate to an apparatus to perform image processing that includes means for receiving an output image merged from a plurality of unique input images, the output image having a first ghosty component containing motion artifacts resulting from the merge of the plurality of unique input images. The apparatus further includes means for comparing the first ghosty component to a target component within each of the plurality of unique input images, the target component encompassing a same relative image area covered by the first ghosty component. The apparatus further includes means for selecting a first reference image from the plurality of unique images based on the comparing the first ghosty component to the target component within each of the plurality of unique input images. The apparatus further includes means for correcting the first ghosty component by replacing at least a portion of the first ghosty component of the output image with at least a portion of the first reference image.

Embodiments disclosed herein may further relate to a data processing system including a processor and a storage device configurable to store instructions to perform image processing. The instructions cause the processor to receive an output image merged from a plurality of unique input images, the output image having a first ghosty component containing motion artifacts resulting from the merge of the plurality of unique input images. The instructions cause the processor to compare the first ghosty component to a target component within each of the plurality of unique input images, the target component encompassing a same relative image area covered by the first ghosty component. The instructions cause the processor to select a first reference image from the plurality of unique images based on the comparing the first ghosty component to the target component within each of the plurality of unique input images. The instructions cause the processor to correct the first ghosty component by replacing at least a portion of the first ghosty component of the output image with at least a portion of the first reference image.

Other features and advantages will be apparent from the accompanying drawings and from the detailed description.

DETAILED DESCRIPTION

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Device Overview

Figure 1:
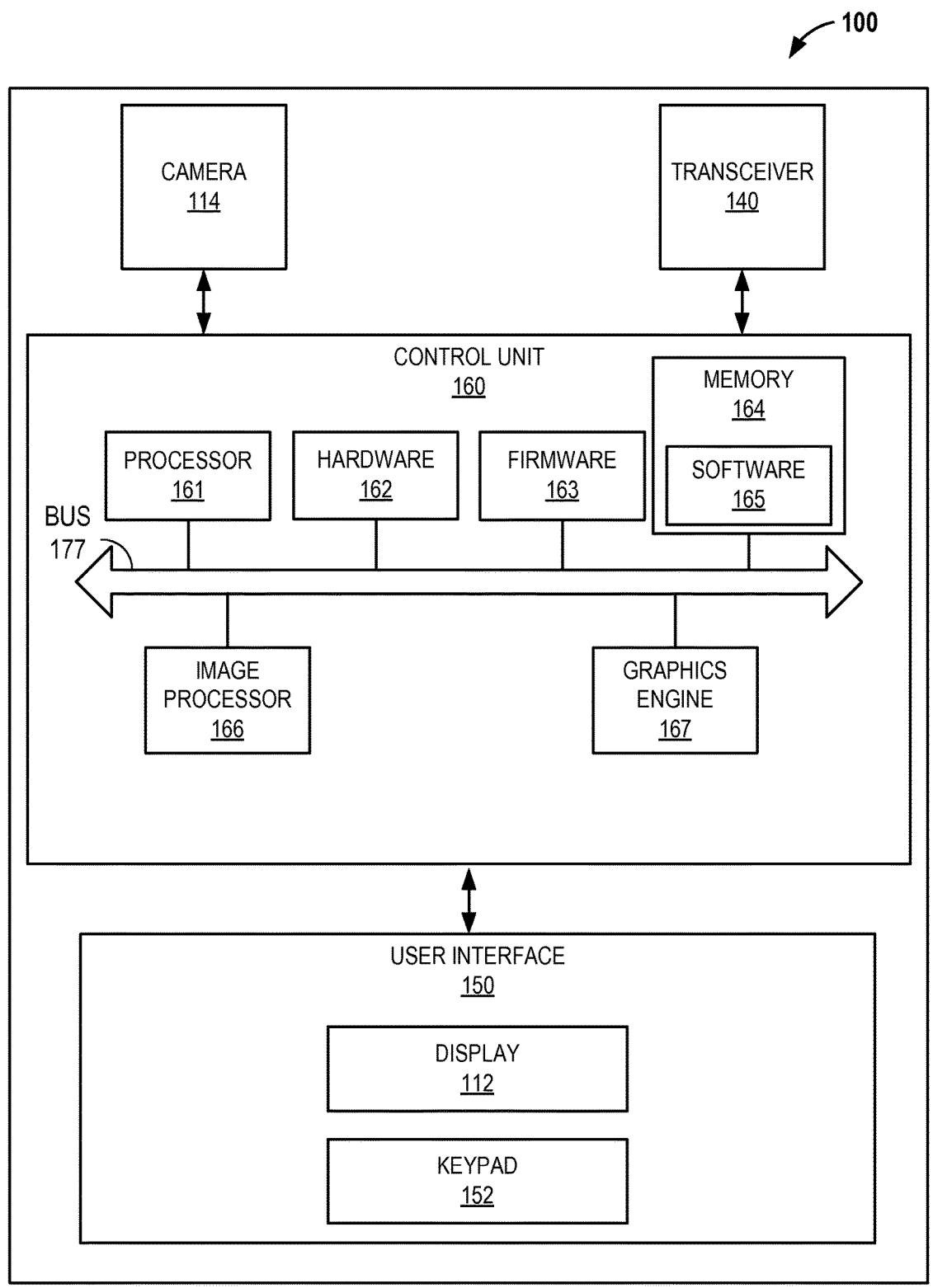
FIG. 1 is a block diagram of an exemplary system in which aspects of the invention may be practiced.

FIG. 1 is a block diagram illustrating an exemplary system in which embodiments of the invention may be practiced. The system may be a device 100, which may include a control unit 160. Control unit 160 can be configured to implement methods of performing various embodiments as described below. For example, the control unit 160 can be configured to implement functions of the device 100 described in FIGS. 5-8. Device 100 can also include a general purpose processor 161, image processor 166, graphics engine 167, and a memory 164. The image processor 166 may include instructions as described in greater detail below for processing multiple images to create a merged output image, selection of reference images and removal of ghosty artifacts. The graphics engine 167 may provide instructions to output display of processed and input images, as well as a user interface. The device 100 may also include a number of device sensors coupled to one or more buses 177 or signal lines further coupled to at least one of the general purpose processor 161 and image processor 166. The device 100 may be a: mobile device, wireless device, cell phone, personal digital assistant, wearable device (e.g., eyeglasses, watch, head wear, or similar bodily attached device), mobile computer, tablet, personal computer, laptop computer, or any type of device that has processing capabilities.

In one embodiment, device 100 is a mobile/portable platform. Device 100 can include a means for capturing an image, such as camera 114. The device 100 may further include a user interface 150 that includes a means for displaying an image, such as the display 112. The user interface 150 may also include a keyboard, keypad 152, or other input device through which the user can input information into the device 100. If desired, integrating a virtual keypad into the display 112 with a touch screen/sensor may obviate the keyboard or keypad 152. Device 100 may include other elements unrelated to the present disclosure, such as a satellite position system receiver, power device (e.g., a battery), as well as other components typically associated with portable and non-portable electronic devices. Device 100 can be a portable electronic device (e.g., smart phone, dedicated imaging device, game device, or other device with image capture, processing and display capabilities).

In some embodiments, the device 100 may be a data processing system, personal computer, network computer, server, or an embedded processing device within another device or consumer electronic product. As used herein, the terms computer, device, system, processing system, processing device, and "apparatus comprising a processing device" may be used interchangeably with the device 100 and include the exemplary embodiments listed herein.

Additional components, not shown, may also be part of the device 100, and, in certain embodiments, fewer components than that shown in FIG. 1 may also be used in device 100. It will be apparent from this description that aspects of the inventions may be embodied, at least in part, in software. That is, the computer-implemented methods of FIGS. 5-8 may be carried out in a computer system or other data processing system in response to its processor or processing system executing sequences of instructions contained in a memory, such as memory 164 or other non-transitory machine-readable storage medium. The software may further be transmitted or received over a network (not shown) via a network interface device. In various embodiments, hardwired circuitry may be used in combination with the software instructions to implement the present embodiments. Thus, the techniques are not limited to any specific combination of hardware circuitry and software, or to any particular source for the instructions executed by the device 100.

Motion Ghost Filtering Overview

Ghosty artifacts and ghosting, as used herein describes an output image anomaly that may occur after a set of images with moving objects/subjects have been merged or combined. For example, when a subject or object within an image changes relative position from one image to another image in a set of input images for HDR processing, panoramic images, or focus stacking.

In one embodiment, Motion Ghost Filtering (MGF) intelligently selects an ideal reference image to reduce or eliminate ghosty artifacts (i.e., ghosting) when merging multiple images into a single output image. The reference image can be the source image for pixels under a motion mask area that MGF can use for creating a final output image.

In one embodiment, MGF can determine which of a set of input images has the greatest individual image quality irrespective of the other images or output image. Upon determining the image with the greatest perceived image quality, MGF can copy the section under the motion mask (e.g., a section that would be susceptible to ghosting) from the single reference image into the final output image. By using a single reference image and an accurate motion mask, MGF can substantially guarantee that a merged output image will not have ghosting. Motion masks (i.e., ghost maps) and MGF are described in greater detail below.

High Dynamic Range Imaging with Motion Ghost Filtering

MGF can correct for ghosting in High Dynamic Range (HDR) images, panoramic images, extended depth of field images (i.e., focus stacking), and other imaging processing techniques that merge or combine multiple images that contain a moving subject. As discussed below in detail, MGF can be effective in removing ghosting in HDR image processing, however many of the techniques described with relation to HDR are also applicable to panoramic imaging and extended depth of field images. Therefore, as described herein, HDR with MGF is just one exemplary embodiment, and does not limit MGF to HDR image processing.

In one embodiment, MGF can create HDR images from a series of Low Dynamic Range (LDR) images. In other embodiments, a separate HDR process, module, or engine processes HDR images and calls MGF to determine which reference image is most appropriate.

Figure 2:
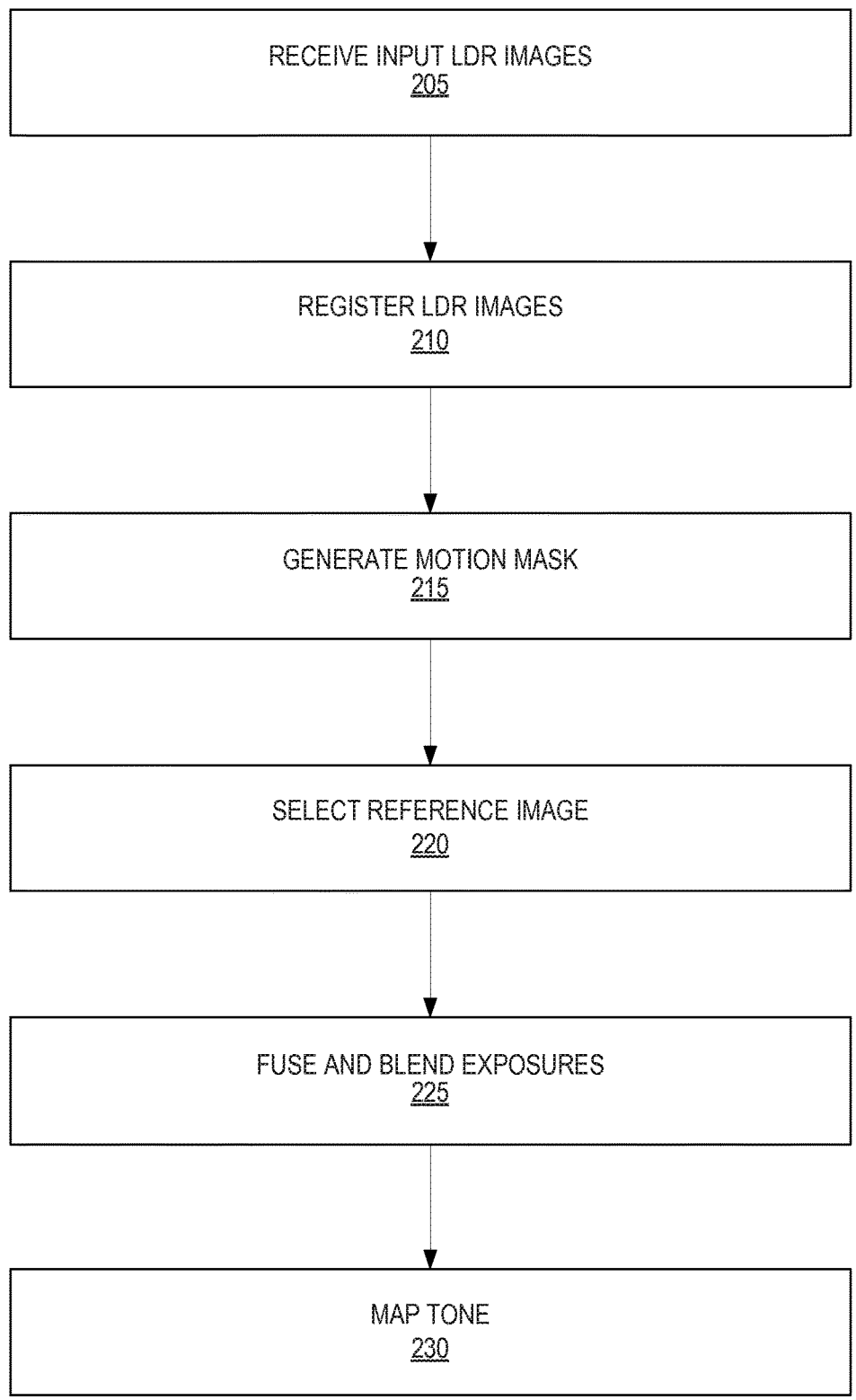
FIG. 2 illustrates a flow diagram of one embodiment of HDR processing with motion ghost filtering.

FIG. 2 illustrates one embodiment of HDR image creation with intelligent reference image selection. At block 205, the embodiment (e.g., MGF) can receive input LDR images. For example, the embodiment can receive a set of 3, 7, or other amount of unique input images. Each of the input images may have a different exposure, color and texture values, just to name a few.

At block 210, the embodiment can register the LDR images. Misalignment can occur when an entire camera viewpoint shifts such that two or more input images capture a scene from a different point of view. For example, handheld camera image captures may suffer from misalignment of an image from one image frame to the next image frame. Misalignment is different than blur or ghosting of a subject moving within the frame. To more accurately compare and combine images in the set of input images, the embodiment can register (i.e., align) each image such that each image represents approximately the same viewpoint (i.e., camera position).

At block 215, the embodiment can generate a motion mask. A motion mask can identify parts of the scene where motion is present and specify the boundary where motion is contained in the image. A motion mask M can be a single-channel binary image of the same size as the LDR input images defined as:

$$M(x, y) = \begin{cases} 1 \text{ if motion is present at pixel } (x, y) \\ 0 \text{ if no motion is present at pixel } (x, y) \end{cases} \quad \text{Eq. 1}$$

To compute M, the embodiment can start with the registered LDR input images $\{I_i\}_{i=1}^{N}$. As used herein, registered input indicates the input images are all aligned relative to each other such that stationary features or elements of each image appear in the same position for each image frame. Registration may occur upon post-processing a misaligned set of images, or may be accomplished during image creation by maintaining the same camera view point throughout a set of input images (e.g., images captured with a camera mounted to a tripod).

As the input images are captured with different exposure settings (e.g., by changing the exposure times or sensitivity/ISO of the sensor), the value of $\{I_i(x,y)\}_{i=1}^{N}$, changes with i. However, if the scene point corresponding to the pixel is static, the irradiance value of the pixel remains constant.

Given the pixel value $I_i(x, y)$, the exposure time $\Delta t_i$ and the camera response function $f$, irradiance of the pixel $E_i(x, y)$ can be computed as:

$$E_i(x, y) = \frac{f^{-1}(I_i(x, y))}{\Delta t_i} \qquad \text{Eq. 2}$$

This relationship normalizes for the exposure time and allows for comparison of the values of a pixel across the image stack (i.e., input image set). Barring under-saturated and over-saturated pixels, $E_i(x, y)$ should remain constant with i if the corresponding scene point is static. However, if this pixel moves in the duration in which the LDR images were captured, $E_i(x, y)$ can change arbitrarily with i and can be used (e.g., by MGF) as a cue to compute M. Given the Y-channels of two exposure images $I_i$, $I_{i+1}$, motion mask $M_{i,i+1}$ can be computed by first computing the illumination invariant difference:

$$|\log(E_i(x,y)) - \log(E_{i+1}(x,y))| \qquad \text{Eq. 3}$$

The exposure images $I_i$, $I_{i+1}$ may be consecutive or alternatively may be from any part of an exposure sequence. This difference image from Eq. 3 can be multiplied by a weighting factor to suppress the effect of over-saturated and under-saturated pixels. To remove speckles, the embodiment can box-filter the difference image. The resulting image can then be thresholded to obtain the motion mask $M_{i,i+}$. In some embodiments, motion mask computations can be determined with other color spaces, such as RGB. The combined motion mask M is then computed by the logical OR of all the pairwise masks. For example, where N is the number of LDR images:

$$M = M_{1,2} \vee M_{2,3} \vee \ldots \vee M_{N-1,N} \qquad \text{Eq. 4}$$

At block 220, the embodiment can select a reference image. Because combining multiple images in the motion mask area can lead to ghosty artifacts, MGF can copy pixels under the motion mask area from one of the LDR images (referred to herein as the reference image). MGF can copy the pixels from the reference image to ensure no ghosty artifacts are present in the final HDR image (i.e., output image). MGF can capture multiple LDR images to generate a final output image (e.g., the HDR image, panoramic image, extended depth of field image). MGF can intelligently select which reference image is selected based on image quality score or criteria as discussed in greater detail below.

At block 225, the embodiment can fuse and blend exposures. The embodiment can generate the weights $w_i$, $i=1, 2, \ldots N$ to fuse the LDR images. The embodiment can obtain the standard HDR in the irradiance domain by the weighted combination of the LDR images:

$$E_{HDR}(x, y) = \sum_{i=1}^{N} w_i(x, y) * E_i(x, y) \qquad \text{Eq. 5}$$

where, $E_i(x,y)$ are the LDR images transformed to the irradiance domain. $E_{HDR}$ is the standard HDR image in the irradiance domain, where no effects of motion have been compensated for and therefore may be prone to ghosty artifacts. To create the ghost-free HDR image, the embodiment can utilize the motion mask M and copy pixels under the motion mask area from the reference image. However, a blind copy can lead to artifacts on the boundary of motion mask. The embodiment can reduce or eliminate boundary artifacts by smoothing the motion mask with a large smoothing kernel prior to blending images. Smoothing ensures transition from the motion mask to the static parts of the scene occurs in a non-abrupt (i.e., slow and smooth) fashion. With B representing the smoothed motion mask, MGF HDR can be computed as:

$$E_{MFGHDR}(x, y) = B(x, y)E_{ref}(x, y) + (1 - B(x, y))E_{HDR}(x, y) \qquad \text{Eq. 6}$$

$$= B(x, y)E_{ref}(x, y) + (1 - B(x, y))$$

$$\sum_{i=1}^{N} w_i'(x, y) * E_i(x, y)$$

where $E_{MGF\ HDR}$ is the MGF HDR image in the irradiance domain, $B(x,y)$ is the smoothed motion mask, and $E_{ref}$ is the reference image.

At block 230, the embodiment can map tone. The embodiment can map tone within the HDR image from the irradiance domain to the pixel intensity domain. The embodiment can first apply the camera response function (i.e., the gamma curve) to the HDR image. Then, the embodiment can apply a variant of the adaptive histogram equalization called the Contrast Limited Adaptive Histogram Equalization (CLAHE) to obtain the final HDR image. In other embodiments, other tone mapping algorithms or techniques may be used in place of the above exemplary tone mapping.

Figure 3A:
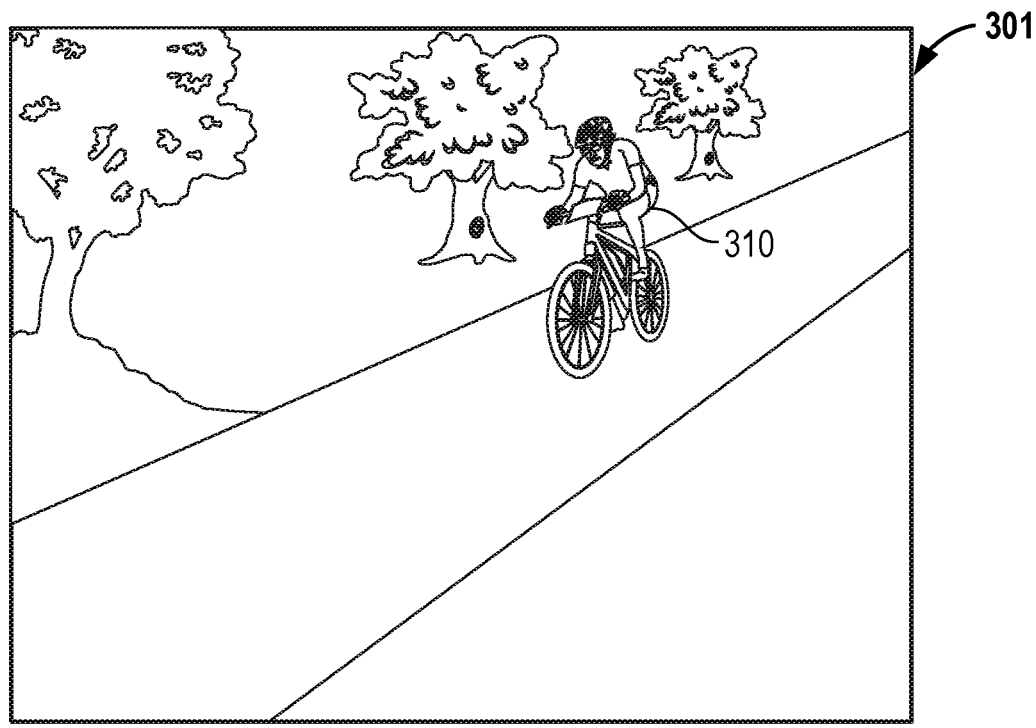
FIGS. 3A, 3B, and 3C respectively illustrate a first, second and third image in a sequential series of captured images, in one embodiment.
Figure 3B:
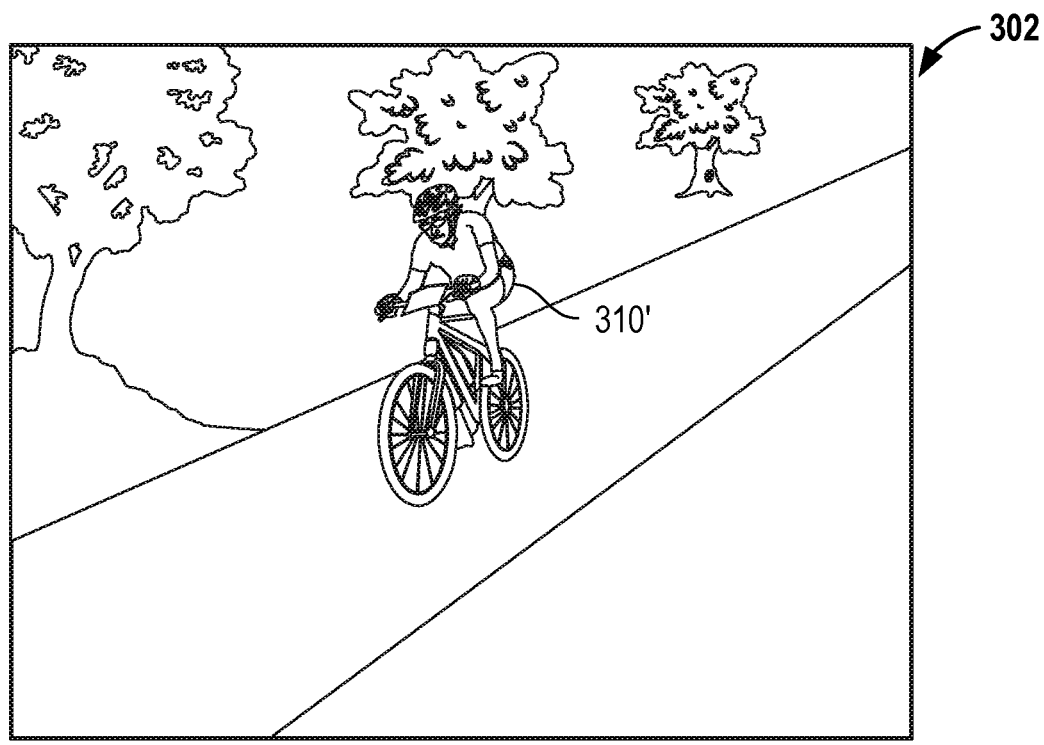
Figure 3C:
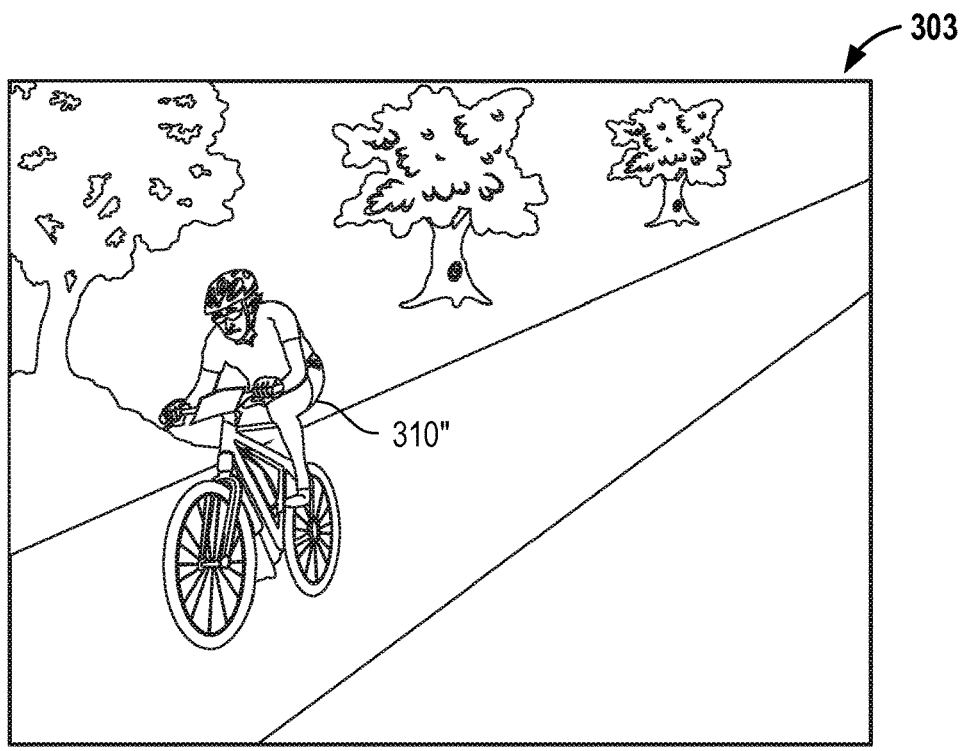

FIGS. 3A, 3B, and 3C illustrate a first, second and third image in a series of input images for multiple image processing (e.g., HDR, or focus stacking). At time t=1, bicyclist is at a first position 310 in the LDR image frame 301. At time t=2, bicyclist is at a second position 310' in the LDR image frame 302. At time t=3, bicyclist is at a third position 310" in the LDR image frame 303. Although a change in exposure may not be readily apparent in the line representation of the input images, each LDR image frame 301, 302 and 303 can represent a differently exposed image capture of the scene. For example, LDR image frame 301 can represent a first image exposure (e.g., underexposure), LDR image frame 302 can represent second image exposure (e.g., a normal, default or standard exposure), and LDR image frame 303 can represent a third image exposure (e.g., overexposure).

Figure 3D:
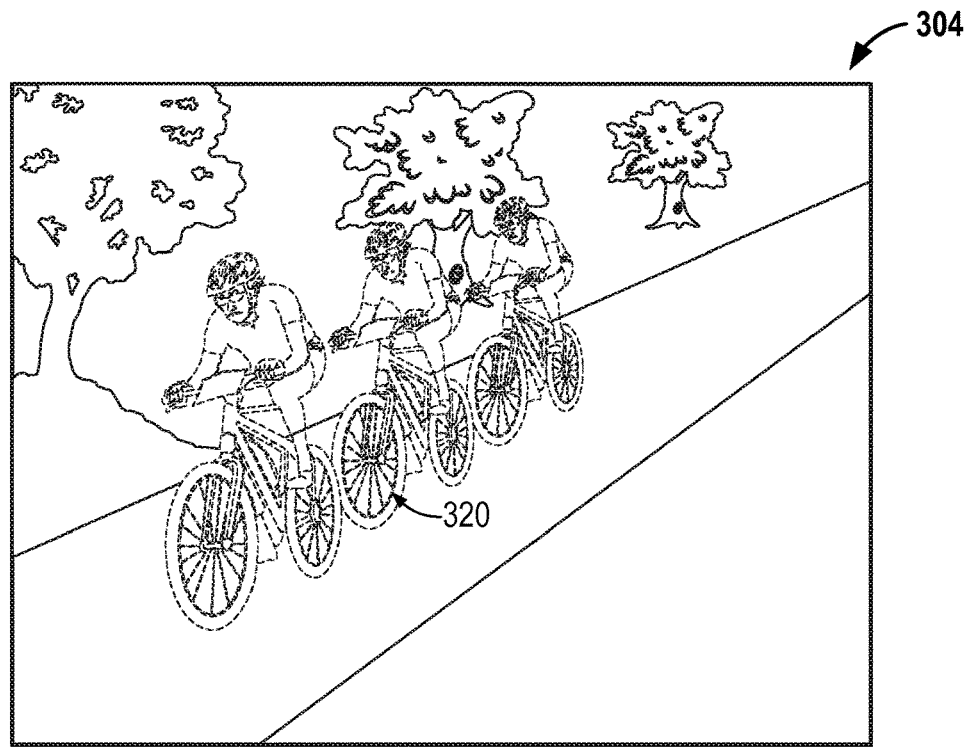
FIG. 3D illustrates a resulting HDR image combined from three LDR input images with different exposures, in one embodiment.

FIG. 3D illustrates a resulting HDR output image combined from three LDR input images with different exposures, in one embodiment. The resulting HDR image 304 contains motion image ghosting 320 resulting from movement of the bicyclist through the image frames while the output image HDR was being generated.

Figure 3E:
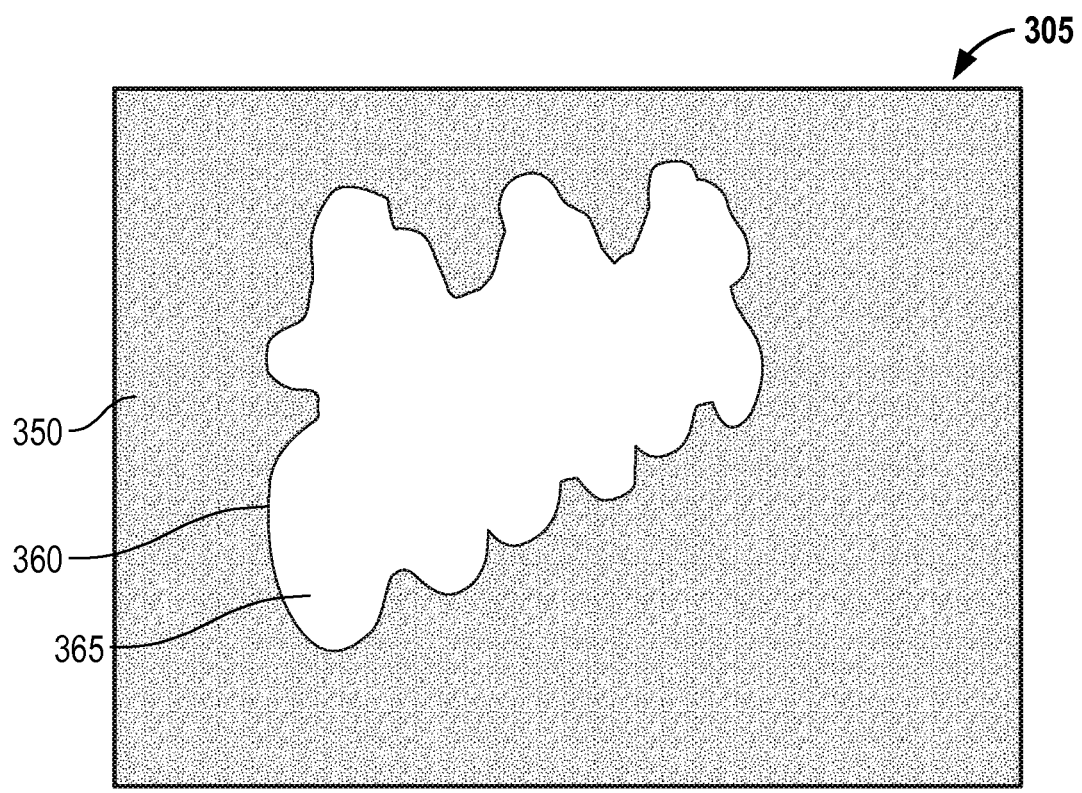
FIG. 3E illustrates a representation of the motion mask and mask boundary for the component isolating the ghosting caused by the movement of the bicyclist, in one embodiment.

FIG. 3E illustrates a representation of the motion mask 305 resulting from the merge of LDR image frames 301-303, in one embodiment. FIG. 3E includes stationary (i.e., static areas without any motion within the defined boundaries) indicated by the section 350. FIG. 3E also includes motion mask boundary 360 for the component 365 isolating the ghosting caused by the movement of the bicyclist.

Figure 4A:
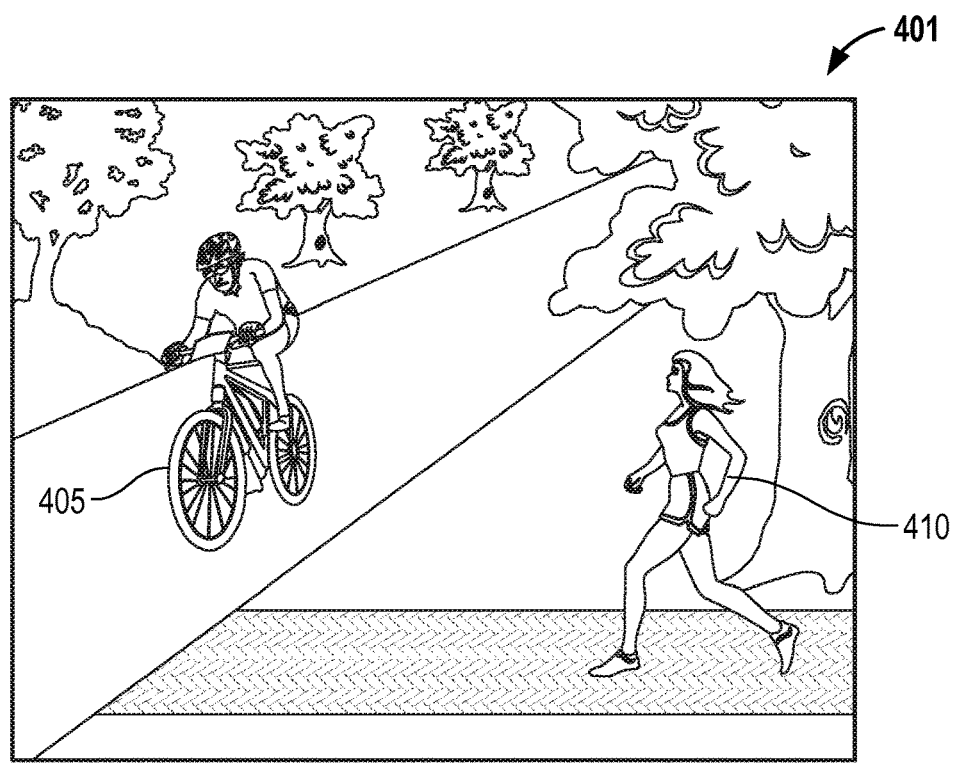
FIG. 4A illustrates an input image with two separate moving subjects within the frame captured at a first moment in time, in one embodiment.
Figure 4B:
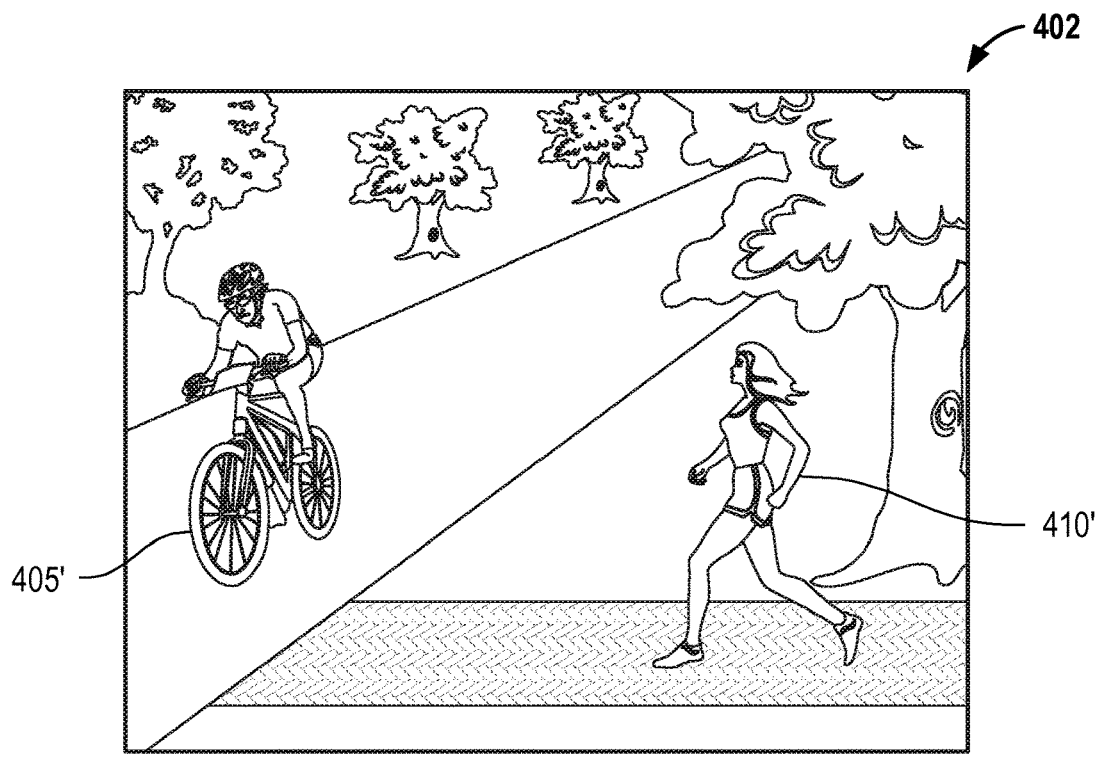
FIG. 4B illustrates a second input image with two separate moving subjects within the frame captured at a second moment in time, in one embodiment.

FIGS. 4A and 4B illustrate two different input images captured at different points in time, each with two separate moving subjects within the frame. The bicyclist at a first position 405 in a first input image 401 has moved to a new position 405' in the second input image 402. The jogger from position 410 has also moved to a new position 410' in the second input image 402. Both bicyclist at a first position 405 and jogger at a position 410 represent moving subjects within a combined output image. MGF can detect the movement of subjects/objects (e.g., the bicyclist and jogger) to reduce or eliminate ghosting that can occur when the images are combined.

Figure 4C:
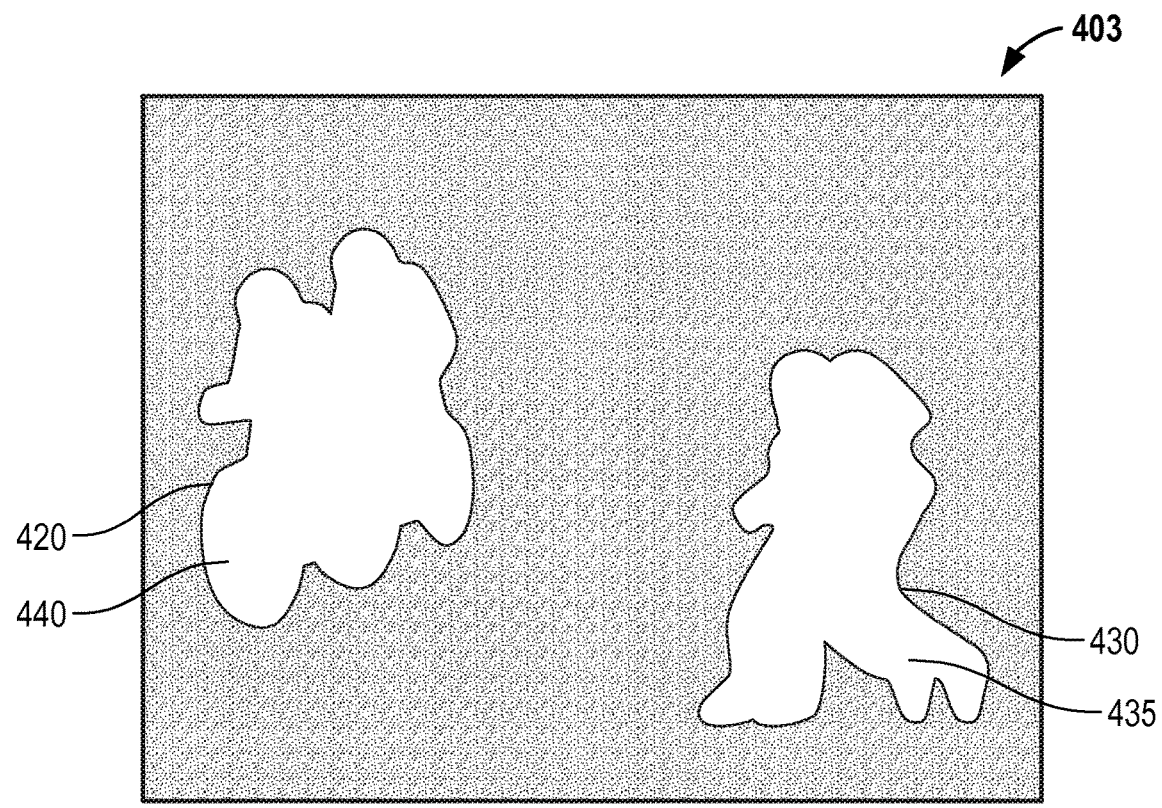
FIG. 4C illustrates a motion mask resulting from a merge of a first input image with a second input image, in one embodiment.

FIG. 4C illustrates a motion mask 403 resulting from a merge of the first input image 401 with the second input image 402. MGF can determine that motion mask 403 has separate unconnected components and treat each component separately when determining reference images. For example, MGF can create separate components within a motion mask 403 such that the bicyclist and jogger each have an individual separate non-connected component. For example non-connected component 420 is associated with the bicyclist movement while the non-connected component 430 is associated with the jogger movement. Each of the non-connected components is separated by static/stationary space.

Figure 4D:
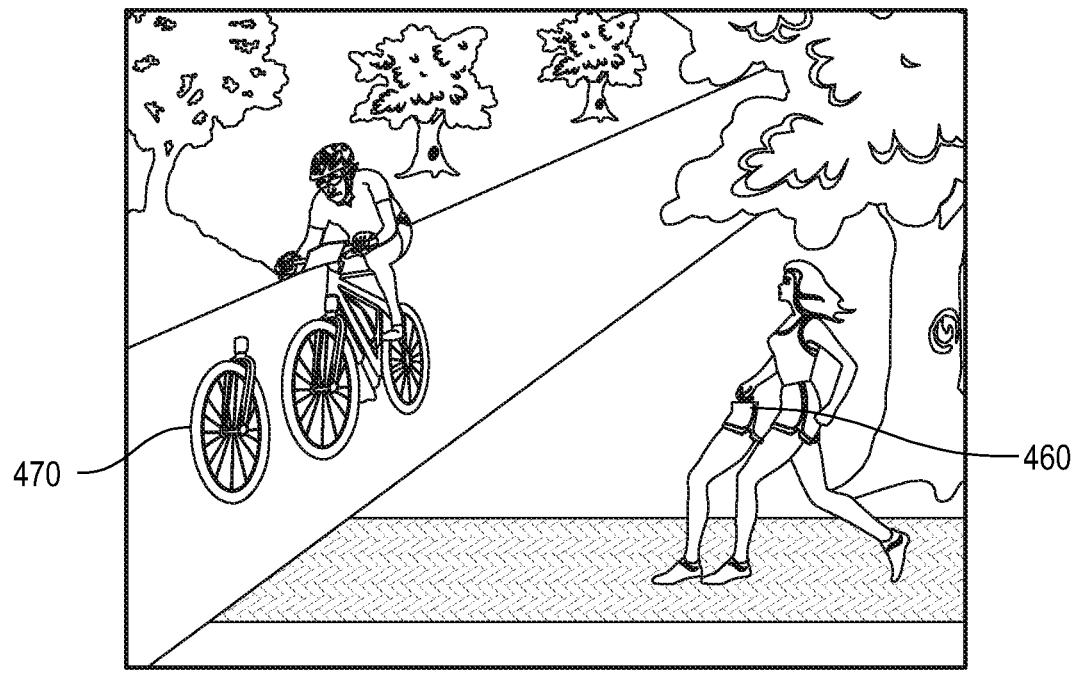
FIG. 4D illustrates a ghosty artifact output image processed from two input images, in one embodiment.

FIG. 4D illustrates a ghosty artifact output image combined from image 401 and 402, in one embodiment. Upon merging images from image 401 and 402 with ghost reduction disabled, some ghosty artifacts (e.g., artifacts 460 and 470) may be present. In one embodiment, MGF can remove ghost artifacts as described below.

In one embodiment, MGF can process (e.g., determine criteria or image quality scores) for the underlying image features separately for each input image. For example, the area 440 under component 420 changes depending on the respective input image. For example, the area 440 associated with first input image 401 may contain a bicyclist captured at first position 405 with a first set of exposure settings. The area 440 associated with second input image 402 may contain a bicyclist captured at new position 405' with a second set of exposure settings. Therefore, the area under the component in first input image 401 may score differently in one or more image quality criteria, than the area under the computer in second input image 402. For example, the bicyclist may be moving faster in one image, resulting in a less sharp image, or the bicyclist may be in a patch of shade from the trees resulting in different color rendition than another image capture. The component 420 can stay constant (i.e., maintain a set boundary) however, the image data underneath the component 420 can change from first input image 401 to second input image 402.

Figure 4E:
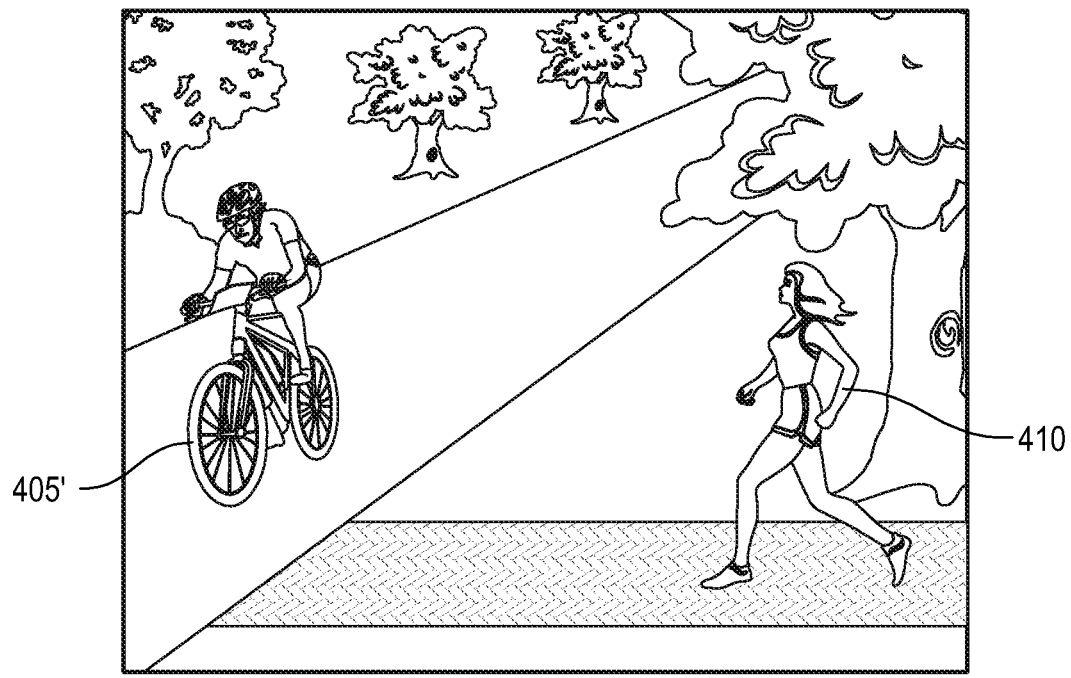
FIG. 4E illustrates an artifact-free output image processed from two input images, in one embodiment.

MGF can also analyze each component separately and independently from each other component within the same motion mask. For example, MGF can determine a best image for a first component and a best image for a second component, where the best image may be different for each component. For example, the jogger at position 410 in the shade of the tree may be well-exposed at position 410 when the jogger at position 410 is directly underneath the tree, but may not be well-exposed at new position 410' when the jogger at position 410' is in more direct sunlight. MGF can determine using well-exposed image quality criteria that the reference image for component 430 can be taken from the first input image 401 instead of the input image from 402. Additionally, for the same output image, MGF may determine using well-exposed image quality criteria that the reference image for component 420 can be taken from the second input image 402 instead of the input image from 401. Therefore, in some embodiments, MGF can select a different reference image (e.g., 401) for one component (e.g., including the jogger at position 410) compared to other components within the motion mask (e.g., the component 420 including the bicyclist at a first position 405). FIG. 4E illustrates an artifact-free output image processed from the jogger at position 410 of input image of image 401 and the bicyclist 405' from the image 402.

Reference Image Criteria

Reference images are the source images for pixels under a motion mask area that MGF can use (i.e., copy from) when creating a final merged output image. Selecting a low quality reference image can result in a correspondingly reduced output image quality. For example, when creating an HDR image, selecting an underexposed image as the reference image can result in noisy and dark pixels causing large degradation in the perceptual quality of the output image. Alternatively, selecting an over-exposed image can result in visibly washed-out image features.

In one embodiment, MGF can formulate the reference image selection as an optimization cost function with embedded exposure, color, saturation, sharpness, and texture criteria. In one embodiment if there are multiple non-connected (e.g., nonadjacent or separate) components (i.e., blobs, or image patches) in the motion mask, MGF can chose a best reference image for each of these components to achieve the highest quality output image. For example, when creating an HDR image, MGF can copy one of the components from a low-exposed image, and another component from a high-exposed image for the best output image. The flexibility of MGF to select a best image for each component is especially useful when images have motion in both the under and over exposed regions.

In one embodiment, MGF can measure criteria (e.g., exposure, color, saturation, sharpness, and texture) and assign a criteria score (i.e., an image quality score) to each component, blob, or patch within each of the respective input images. For example, each input image in a set of input images can have an associated motion mask as described above. The motion mask may have one or more separate/distinct component areas with unique image characteristics. In one embodiment, MGF can determine a respective image quality for the area in the image associated with each component (i.e., blob, or patch).

Figure 5:
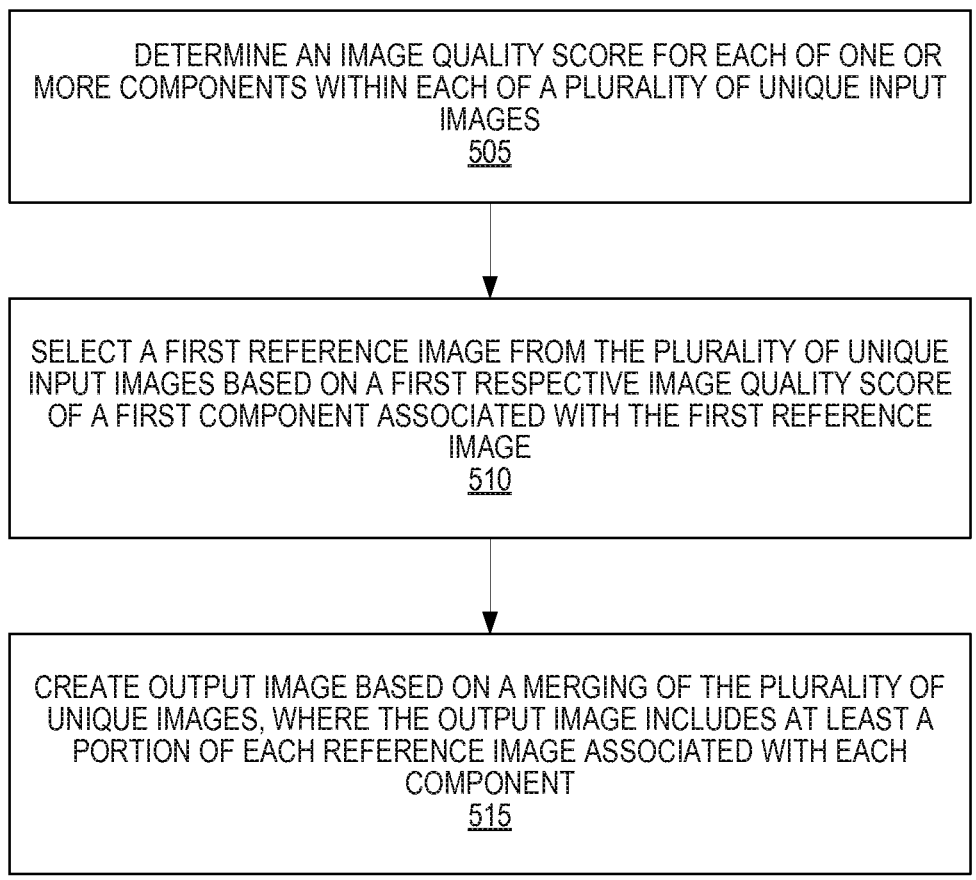
FIG. 5 illustrates a flow diagram of motion ghost filtering, in one embodiment.

FIG. 5 illustrates a flow diagram of motion ghosty filtering, in one embodiment. At block 505, the embodiment (e.g., MGF) can determine an image quality score for each component within each of a plurality of unique images. In one embodiment, MGF can sum all the criteria scores and rank the results to determine which input image received the highest overall criteria score for each respective component in the motion mask. MGF can select the highest overall score as the reference image for each component.

In some embodiments, MGF can change each criteria weight based on perceived importance of the particular criteria. For example, MGF may determine a proper exposure is more important than color and give the exposure score a greater weight than other criteria. In this previous example, if each of the criteria is assigned an initial weight of 1, MGF may reduce other criteria weight (e.g., to 0.5) and/or increase the weight of the exposure criteria (e.g., to 2).

At block 510, the embodiment can select a first reference image from the plurality of unique input images based on a first respective image quality score of a first component associated with the first reference image. MGF can select the image with the highest score for a respective component as the corresponding reference image.

At block 515, the embodiment can create an output image based on a merging of the plurality of unique images. The output image can also include at least a portion of each reference image associated with each component. For example to create an HDR output image from a set of input images, MGF can merge, fuse, or blend each input image to create a single output image with the most visually pleasing parts of each input image. In some embodiments, MGF can directly copy the component of the reference image into the output image. For example, a first component may represent an area of an image with a person running in a shade of a tree while a second component may represent a person biking on a sunlit path. MGF may determine each component area with the most visually pleasing image characteristics separately and independently from each other component area and copy the "best" or highest scoring reference image component into the final output image.

Color Richness

Richness of color can be an important factor in determining the quality of an image. Perceived image quality may be strongly biased towards colorful imagery. MGF can objectively measure the color found within an image to provide an image quality score based on color. In some embodiments, the higher the color criteria (i.e., richness of color) the greater likelihood the image will be selected as the reference image compared to other images with less color.

In one embodiment, MGF can convert an input image to YUV color space before measuring richness of color (e.g., from RGB color space). In YUV color space the Y channel represents the intensity values and channels U and V represent color information. MGF can determine richness of color score by summing the absolute value of chroma channels U and V within the image patch (i.e., |U|+|V|). MGF may also measure color information of an image under the motion mask as:

$$J_{color}(i) = \sum_{x,y \in M} (U_i(x, y) + V_i(x, y)) \quad \text{Eq. 7}$$

Well-Exposed Pixels

Pixels that are under-saturated i.e., pixels with an intensity value close to zero, may contain a greater than average amount of noise. When noisy pixels are copied to an output image the overall perceptual quality of the output image may be reduced. Alternatively, pixels on the opposite spectrum of the intensity range (e.g., intensity values close to 255) may be considered oversaturated/overexposed and also can cause the reduction in the quality of an output image.

In one embodiment, the exposure level of an image can also be used as criteria for measuring image quality and choosing a reference image. MGF can measure the level of exposure for pixels within a component of the motion mask. For example, $$1 - \left(1 - \frac{Y}{128}\right)^N \quad \text{Eq. 8}$$

where Y is the pixel intensity and N is the positive exponent in the weighting factor (e.g., 6 or other value). Mid-range exposure values may lead to improved perceptual quality of the output image (e.g., for a HDR image). Therefore, in some embodiments, MGF scores exposure criteria higher when the image pixels have mid-range intensity values (i.e., around $Y_{mid}$=128). As $Y_{mid}$ moves farther to either side of the intensity range, the desirability of selecting the respective image as the reference image decreases.

In one embodiment, MGF measures the well-exposed criterion by a hat function on the pixel intensity values with $Y_{mid}$=128.

$$J_{we}(i) = \sum_{x,y \in M} \left(1 - \frac{Y_i(x, y) - Y_{mid}}{Y_{mid}}\right)^6 \quad \text{Eq. 9}$$

Unsaturated Pixels

In one embodiment, MGF can determine the number of unsaturated pixels covered by a respective component of the motion mask. An input image (e.g., an LDR image as part of a set of images for HDR processing) may contain a number of saturated pixels that can make a respective input image a bad choice as the reference image. To measure the intensity of a scene point, camera sensors may temporally integrate the number of photons that fall on the pixel grid during the exposure time. However, the intensity values may have an upper-limit of 255 and pixels corresponding to very bright scene points are capped at 255. Therefore, there may be an inherent loss of information in regions with saturated pixels close to the 255 value. Moreover, oversaturated pixels may also cause deterioration in the perceptual quality of an output image (e.g., a final HDR image).

In one embodiment, MGF can reduce the image quality score for components containing saturated pixels. For example, MGF can penalize input images containing pixels with intensity greater than a threshold value (e.g., a value of 253, where 255 is the maximum intensity for the pixel).

In one embodiment, MGF can penalize saturated pixels with a saturation penalty $C_i$ For example, $$J_{sat}(i) = -\sum_{x,y \in M} C_i I(Y_i(x, y) > 250) \quad \text{Eq. 10}$$

where, $C_i$ is the saturation penalty for image I and I is the indicator function and $Y_i$(x, y) is the intensity value of the pixel (x, y). The saturation penalty $C_i$ is a function of the image index i. The more saturated pixels exist within the component, the more MGF will attempt to bias the cost function towards selecting the low-exposure input image (e.g., a LDR image). This can be achieved by setting the values of saturation penalty such that $C_{i-1}$ <$C_i$. The final cost function is then the weighted combination of the individual cost functions:

$$J_{cost}(i) = J_{color}(i) + \alpha J_{we}(i) + \beta J_{sat}(i) \quad \text{Eq. 11}$$

where MGF selects reference image to be the input image (e.g., an LDR image) with index î, and where, $$\hat{i} = \arg\max_{i=1,2,\ldots,N} J_{cost}(i) \quad \text{Eq. 12}$$

Additional Criteria

In other embodiments, MGF calculates additional criteria in addition to or instead of one or more of the criteria described above. For example, MGF can calculate image quality scores based on texture, contrast, sharpness, or other image quality metrics. For example, MGF can compute the gradient of the input image to rank Texture/Sharpness richness of each motion region (i.e., the region(s) covered by each component of the motion mask). MGF can use a classifier trained to detect blurred images to avoid selecting a blurred input image as reference. For example, MGF may use a metric that measures the sharpness/blurriness of an input frame, in addition to an exposedness and colorfulness of the region as described. In some embodiments, MGF can use a classifier to classify the image/patch under the mask as sharp/blurry.

In yet other embodiments, MGF can use one, all, or any combination/weight of the above described criteria/metrics. For example, MGF may determine to use color criteria and skip/ignore all other criteria for determining a reference image. MGF may also determine all criteria except for saturation should be less important and change the relative weights of the scores or calculations to reflect the added importance of saturation (i.e., or the relative lower importance of all other criteria).

Ghost-Free Weight Modification

As described above, MGF can capture multiple unique LDR images (i.e., input images) each taken with a different exposure to blend into an HDR image. For example, a first image may be taken at exposure "X" (e.g., a first shutter speed, while aperture and ISO are held constant), while a second image may be taken at exposure "Y" (e.g., a different shutter speed than what was used to generate exposure "X" while aperture and ISO are held constant). MGF can receive two or more LDR input images taken at different exposure levels to create an HDR output image that combines aspects from each of the LDR input images.

Given a set of N exposure-bracketed input images $I_1, I_2, \ldots I_N$. MGF or an HDR processing program may produce an output HDR image based on a weighted sum of all input images. For example, Eq. 13:

$$I_{HDR}=[(W_1)(I_1)]+[(W_2)(I_2)]+[(W_3)(I_3)]+ \ldots +[(W_N)(I_N)]$$ Eq. 13 where for each pixel, $W_1+W_2+ \ldots +W_N=1$. The above are element wise multiplications of the matrix elements. Two images combined with equal 50% weight would result in an HDR output image resulting in data from the two images in a 50/50 ratio. For example, each pixel within the output HDR image may include half of each of the two initial image values for the equivalent pixel. The exact weight values may depend upon the type of HDR implementation. Different types of HDR algorithms may generate different respective weights when creating a final merged HDR output image.

Merging or combining images as described above with a HDR based weighted sum may be optimized for HDR exposure blends but not actively correct for motion ghosting in the output image. When an element, subject, or object within an input image moves, the resulting output image may contain a mix of unrelated data (e.g., background data combined with subject data). Therefore, HDR blending or merging of LDR images may produce an accurate or improved dynamic range output but may also inadvertently introduce ghosty artifacts into the final image.

To reduce or eliminate ghosting from HDR output results, MGF can adjust the weight of each reference image to eliminate ghosty artifacts based on components in a motion mask. MGF can adjust the weight of each reference image in both the pixel domain and irradiance domain. Irradiance as used herein is the actual brightness of the image scene irrespective of any particular exposure settings of the camera. For example, changing the exposure settings of a camera can produce under or overexposed images while irradiance values in a scene do not change.

Figure 6:
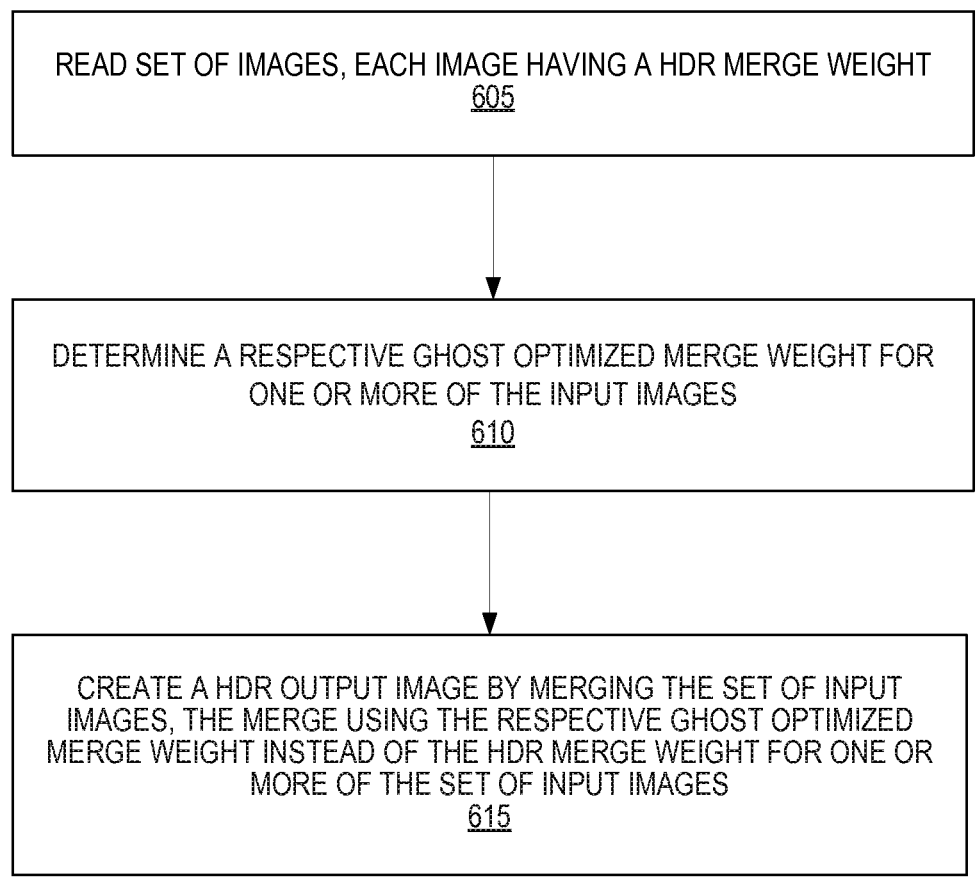
FIG. 6 illustrates a flow diagram of ghost-free weight modification, in one embodiment.

FIG. 6 illustrates a flow diagram of ghost-free weight modification, in one embodiment. At block 605, the embodiment reads a set of images to merge together into a high dynamic range (HDR) output image, wherein each of the images have a respective HDR weight.

At block 610, the embodiment can replace, before merging the set of images using a weighted average of the set of images, the respective HDR weight with a respective ghost-free weight for each of the images.

At block 615, the embodiment can merge the set of images using the weighted average of the set of images, the weighted average of the images based upon the respective ghost-free weight for each of the images.

In one embodiment, for each component in a motion mask m, MGF can independently modify the weights $W_1, W_2, \ldots W_N$ used to create $I_{HDR}$ as described above. In one embodiment, motion masks may be a smooth mask such that M is any value from 0 (i.e., no motion) to 1 (i.e., motion). The motion mask may have P non-connected components where P>=0. When P=0, the motion mask does not contain any components therefore no motion is in the scene which can result in a ghost-free output image. Each mask can have a number of non-connected components such that there may be P reference images each with an individual weight used for blending into the HDR output image. MGF can reduce or eliminate ghosting in the output image by using a weighted combination of the ghosty-image ($I_{HR}$) and a respective reference image using the predetermined motion mask R.

$$\begin{aligned}I_{MGFHDR} &= [(M)(R)] + [(1-M)\{I_{HDR}\}] \\ &= [(M)(R)] + [(1-M)\{[(W_1)(I_1)] + [(W_2)(I_2)] + \\ &\quad [(W_3)(I_3)] + \ldots + [(W_N)(I_N)]\}] \\ &= [(W_1')(I_1)] + [(W_2')(I_2)] + \\ &\quad [(W_3')(I_3)] + \ldots + [(W_N')(I_N)]\end{aligned}$$ Eq. 14 where, $W_j'=[(1-M)W_j]$ when $I_j$ is not the reference image, and $W_j'=M+[(1-M)\tilde{W}j]$ when $I_j$ is the reference image. Stationary areas (i.e., areas not within the motion mask) can remain unmodified while MGF ensures areas with motion will be ghost-free in the output image.

In one embodiment, a motion mask can have two or more components (e.g., patches or blobs) as described above. MGR can adjust the weight for each reference image associated with each of the components.

Ghosty Artifact Removal

In one embodiment, MGF can reduce or eliminate the ghosting or ghosty artifacts in an output image after the output image has been generated with ghosty artifacts.

Figure 7:
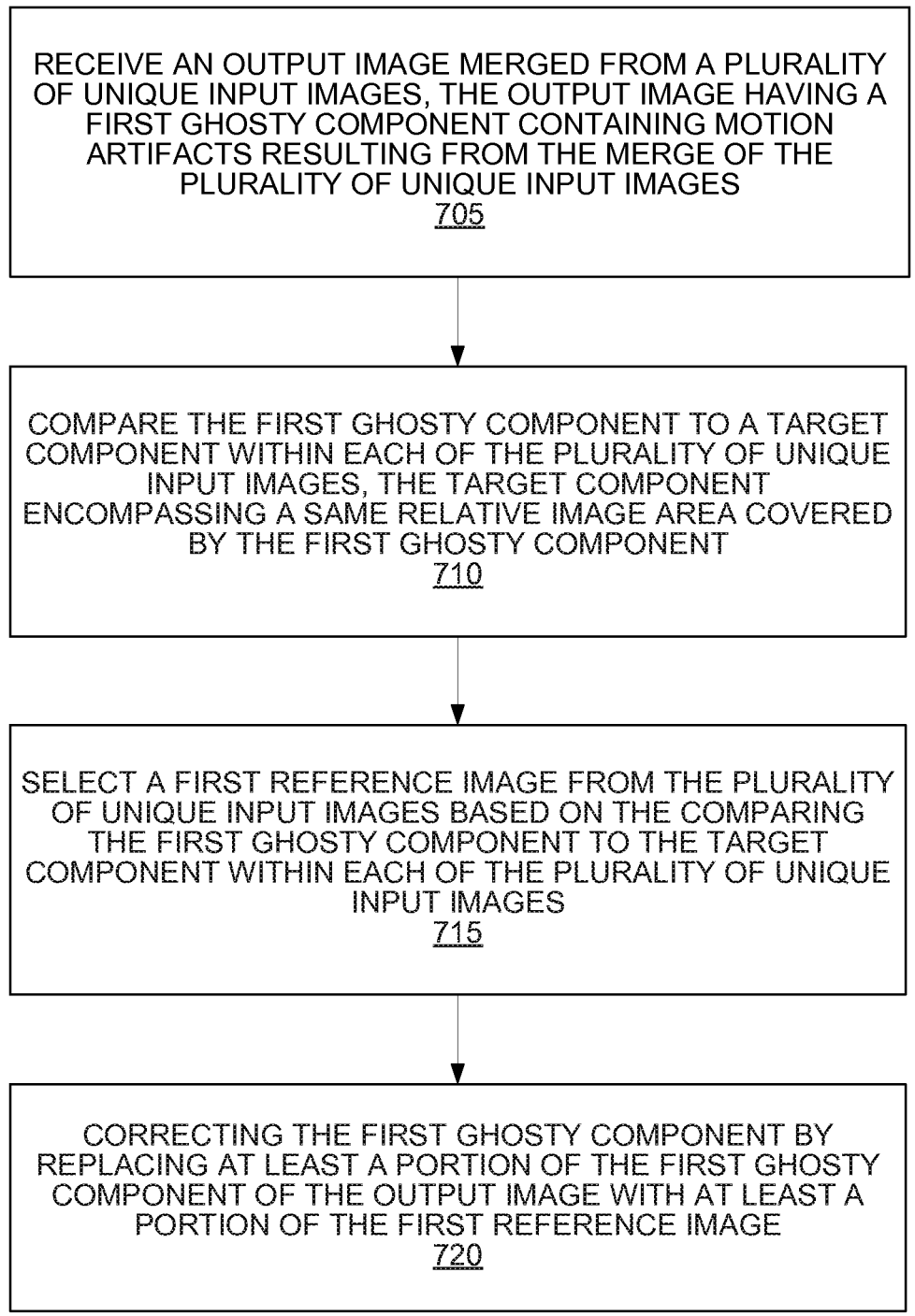
FIG. 7 illustrates a flow diagram of ghosty artifact removal, in another embodiment.

FIG. 7 illustrates a flow diagram of ghosty artifact removal, in one embodiment. At block 705, the embodiment can receive an output image merged from a plurality of unique input images, the output image having a first ghosty component containing motion artifacts resulting from the merge of the plurality of unique input images. For example, the embodiment may receive an HDR imaging output based on a set of input images. The HDR imaging output may be generated by MGF or MGF may read a pre-determined HDR imaging output to correct for ghost artifacts. In some embodiments, multiple separate distinct components may contain ghost artifacts (e.g., two or more ghosty components containing motion artifacts).

At block 710, the embodiment can compare the first ghosty component to a target component within each of the plurality of unique input images, the target component encompassing a same relative image area covered by the first ghosty component. The embodiment can attempt to compare one or more ghosty components within the output image with the original images from the set of input images. During the comparison, the embodiment can determine whether an image from the input images is more similar to the output image component than other input images. In one embodiment, MGF can determine image similarity by comparing texture, color or other criteria. Similarity is beneficial for determining the reference image in order to minimize any blending artifacts that may occur when the two images are combined. For example, if the color or texture of two images is very different, the combination or merge into a single image can result in a lower quality output image than if the two images were more similar.

In one embodiment, MGF can maximize similarity of a reference image with Pixel-level structural similarity or Blob-level similarity. MGF can compare similarity and merge two or more components of a reference image independently with Pixel-level structural similarity or Blob-level similarity. For example, MGF can determine component A from image X is most similar to component A within the output image, while component B from image Y is most similar to component B within the output image. Upon determining each respective reference image for each individual component, MGF can copy the component to the output image to create an updated output image.

In one embodiment, MGF can use Pixel-level structural similarity by Normalized Cross Correlation (NCC) or difference of pixels covered by the respective component of the motion mask. For example, MGF can compute a difference between each pixel value of a candidate reference image component (e.g., one of the set of input image components) and the output image. As used herein the pixel value can be any measurable pixel information, such as exposure or color. MGF can sum up the total of all the differences for each pixel value in the component (i.e., blob or patch) to return a final difference score between the respective input image and the output image. MGF can select the input image (e.g., the image associated with the component) with the lowest difference score (e.g., the most similar image).

In another embodiment, MGF can calculate Blob-level (i.e., patch or component level) similarity. Instead of computing the difference between each pixel within a component and the output image, blob-level similarity can compare the entire blob of the component to the entire blob in the output image. For example, MGF can calculate the means of Red, Green, and Blue (RGB) channels for the pixels covered by the respective component (i.e., blob, or patch) of the mask. MGF can then compute the difference of the component means of RGB channels in the component to the means of RGB channels in the output image. Upon calculating the difference between each respective input image and the output image, the image with the least different (most similar) means to the output image can be selected as the reference image.

At block 715, the embodiment can select a first reference image from the plurality of unique input images based on the comparing the first ghosty component to the target component within each of the plurality of unique input images. For example, the embodiment can select a reference image from the set of input images, and use the reference image to modify the ghosty artifact component(s) of the output image. MGF can select a reference image with the closest similarity to the ghosty image component. In one embodiment, MGF selects the reference image based on similarity of one or more criteria of exposure, color, saturation, or texture.

At block 720, the embodiment can correct the first ghosty component by replacing at least a portion of the first ghosty component of the output image with at least a portion of the first reference image. For example, the MGF can manipulate or edit an output image to create a final image result with reduced or eliminated ghost artifacts. In some embodiments, MGF can copy a clean (i.e., lacking motion ghosting or artifacts) section from the reference image to override the respective area in an output image. For each component, MGF can copy a respective reference image over the image area represented by the ghosty component.

Artifact-Free Blending

In one embodiment, MGF can blend or merge multiple input images into an artifact-free output image by matching chroma and illumination. Before blending of one or more images, MGF can convert the reference and HDR output images to YUV color space or log(YUV) color space. MGF matches the chroma (i.e., color) and illumination (i.e., intensity) of each image (i.e., reference image Ri) to the chroma and/or illumination of the HDR output image (i.e., $I_{HDR}$). As described above, a reference image refers to the selected image to be merged with other reference images when creating the output image. A different reference image may be selected for use with the area under each component of a motion mask. Matching chroma and illumination can reduce or eliminate blending artifacts caused by different chroma and illumination differences between reference images and a final merged HDR output image.

In alternate embodiments, MGF can convert images to RGB color space or log(RGB) color space. Within RGB or log(RGB) color space, MGF can shift the means from one RGB channel to another. For example if one reference image has more Red than the HDR output image, MGF can color shift the respective reference image to match the channel levels of the HDR output image.

Figure 8:
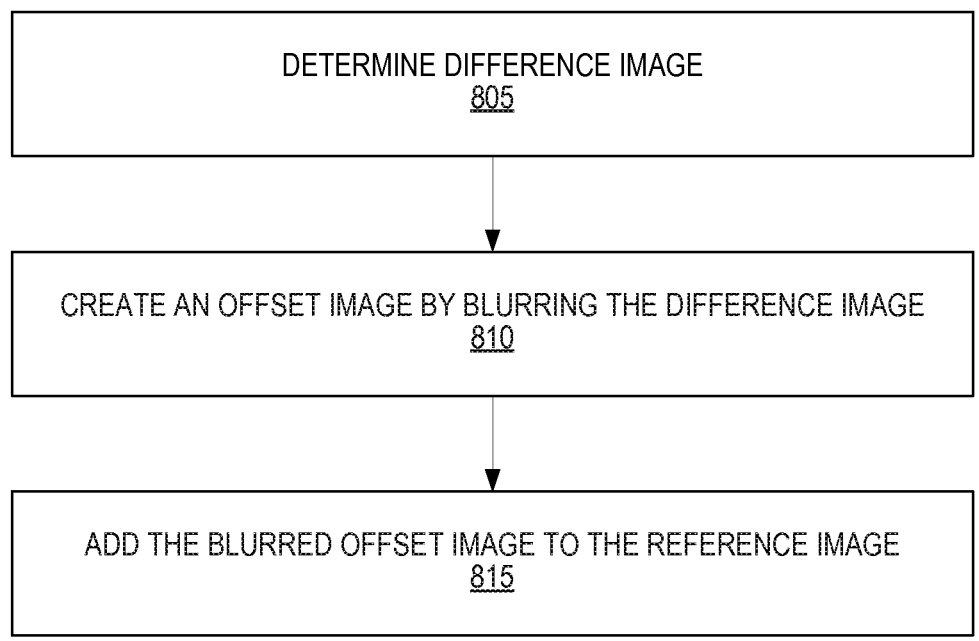
FIG. 8 illustrates a flow diagram of ghosty artifact removal, in another embodiment.

FIG. 8 illustrates a flow diagram of artifact-free blending by matching chroma and illumination. At block 805, the embodiment can create a set of difference images by calculating the pixel-wise difference for each of the reference images used to create an HDR output image (e.g., difference image $Di=I_{HDR}-Ri$). For example, the embodiment compares each pixel from a first reference image to each pixel within the HDR output image to create a difference image associated with the first reference image. Each reference image pixel can be compared to an equivalent pixel within the HDR output image, where equivalent relates to a pixel within the same relative pixel location. For example a pixel at location/coordinates "X" within the reference image will be compared to whichever pixel exists at location/coordinates "X" within the HDR output image.

At block 810, the embodiment can blur each of the difference image Di to produce Di'. The embodiment can blur difference images to average the neighborhood of a pixel within each difference image to result in a smooth offset image Di'. In other embodiments, MGF blurs the reference image and the HDR output image separately before determining the pixel-wise difference.

At block 815, the embodiment can add/combine the blurred (i.e., smooth) offset image to the respective reference image to produce a corrected reference image Ri'. For example, Ri'=Ri−Di'. The embodiment can provide the corrected reference image as input for a linear combination of images resulting in an artifact-free output image.

MGF may be implemented as software, firmware, hardware, module or engine. In one embodiment, the previous MGF description may be implemented by the general purpose processor 161 in device 100 to achieve the previously desired functions.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device.

In some aspects a wireless device may comprise an access device (e.g., a Wi-Fi access point) for a communication system. Such an access device may provide, for example, connectivity to another network through transceiver 140 (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits and algorithm steps described in connection with the embodiments disclosed herein may be implemented as electronic hardware, computer software, or combinations of both. To clearly illustrate this interchangeability of hardware and software, various illustrative components, blocks, modules, engines, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions, methods, or modules described (e.g., FIGS. 5-8) may be implemented in hardware (e.g., hardware 162), software (e.g., software 165), firmware (e.g., firmware 163), or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A machine-implemented method for image processing, the machine-implemented method comprising:
   receiving a plurality of input images each of which includes at least one moving object that changes relative position from one image to another image in the plurality of input images;
   generating a motion mask for the at least one moving object in the plurality of input images, the motion mask comprising at least one component, wherein a component defines an area in all of the plurality of input images where a moving object is present in any of the plurality of input images;

determining an image quality score for the at least one component in each of the plurality of input images, wherein the image quality score is an overall score based on measured one or more image criteria within a single component;

selecting a reference image from the plurality of input images for the at least one component based on the image quality score;

creating a high dynamic range (HDR) output image based on a merging of the plurality of input images, wherein creating the HDR output image includes replacing the at least one component in the HDR output image with the at least one component in the reference image;

after creation of the HDR output image, determining one or more differences between the reference image and the HDR output image;

generating a corrected reference image based on the one or more differences between the reference image and the HDR output image; and creating a corrected HDR output image based on the corrected reference image.

2. The machine-implemented method of claim 1, wherein the component comprises a bounded area of motion of the moving object captured at different times within the plurality of input images.

3. The machine-implemented method of claim 1, wherein the motion mask is computed from a logical OR of masks from sequential low dynamic range (LDR) images.

4. The machine-implemented method of claim 1, wherein the measured one or more image criteria comprises at least a color.

5. The machine-implemented method of claim 1, wherein the measured one or more image criteria comprises at least a saturation.

6. The machine-implemented method of claim 1, wherein the measured one or more image criteria comprises at least a sharpness.

7. The machine-implemented method of claim 1, wherein the measured one or more image criteria comprises exposure, color and saturation.

8. The machine-implemented method of claim 1, wherein generating the corrected reference image comprises forming a difference image based on the one or more differences between the reference image and the HDR output image, blurring the difference image to form a blurred difference image, and combining the blurred difference image and the reference image to generate the corrected reference image.

9. The machine-implemented method of claim 1, wherein generating the corrected reference image comprises blurring the reference image to form a blurred reference image, blurring the HDR output image to form a blurred HDR output image, determining one or more differences between the blurred reference image and the blurred HDR output image to form a difference image, and combining the difference image and the reference image to generate the corrected reference image.

10. An apparatus for image processing comprising:
means for receiving a plurality of input images each of which includes at least one moving object that changes relative position from one image to another image in the plurality of input images;
means for generating a motion mask for the at least one moving object in the plurality of input images, the motion mask comprising at least one component, wherein a component defines an area in all of the plurality of input images where a moving object is present in any of the plurality of input images;
means for determining an image quality score for the at least one component in each of the plurality of input images, wherein the image quality score is an overall score based on measured one or more image criteria within a single component;
means for selecting a reference image from the plurality of input images for the at least one component based on the image quality score;
means for creating a high dynamic range (HDR) output image based on a merging of the plurality of input images, wherein creating the HDR output image includes replacing the at least one component in the HDR output image with the at least one component in the reference image;
means for determining, after creation of the HDR output image, one or more differences between the reference image and the HDR output image;
means for generating a corrected reference image based on the one or more differences between the reference image and the HDR output image; and
means for creating a corrected HDR output image based on the corrected reference image.

11. The apparatus of claim 10, wherein the motion mask is computed from a logical OR of masks from sequential low dynamic range (LDR) images.

12. The apparatus of claim 10, wherein the measured one or more image criteria comprises at least a color.

13. The apparatus of claim 10, wherein the measured one or more image criteria comprises at least a saturation.

14. The apparatus of claim 10, wherein the measured one or more image criteria comprises at least a sharpness.

15. The apparatus of claim 10, wherein the measured one or more image criteria comprises exposure, color and saturation.

16. The apparatus of claim 10, wherein the means for generating the corrected reference image comprises means for forming a difference image based on the one or more differences between the reference image and the HDR output image, means for blurring the difference image to form a blurred difference image, and means for combining the blurred difference image and the reference image to generate the corrected reference image.

17. The apparatus of claim 10, wherein the means for generating the corrected reference image comprises means for blurring the reference image to form a blurred reference image, means for blurring the HDR output image to form a blurred HDR output image, means for determining one or more differences between the blurred reference image and the blurred HDR output image to form a difference image, and means for combining the difference image and the reference image to generate the corrected reference image.

18. A data processing device for image processing comprising:
a processor; and
a storage device coupled to the processor and configurable for storing instructions, which, when executed by the processor cause the processor to:
receive a plurality of input images each of which includes at least one moving object that changes relative position from one image to another image in the plurality of input images;
generate a motion mask for the at least one moving object in the plurality of input images, the motion mask comprising at least one component, wherein a component defines an area in all of the plurality of input images where a moving object is present in any of the plurality of input images;

determine an image quality score for the at least one component in each of the plurality of input images, wherein the image quality score is an overall score based on measured one or more image criteria within a single component;

select a reference image from the plurality of input images for the at least one component based on the image quality score;

after creation of the HDR output image, create a high dynamic range (HDR) output image based on a merging of the plurality of input images, wherein creating the HDR output image includes replacing the at least one component in the HDR output image with the at least one component in the reference image;

determine one or more differences between the reference image and the HDR output image;

generate a corrected reference image based on the one or more differences between the reference image and the HDR output image; and create a corrected HDR output image based on the corrected reference image.

19. The data processing device of claim 18, wherein the measured one or more image criteria comprises at least a color.

20. The data processing device of claim 18, wherein the measured one or more image criteria comprises at least a saturation.

21. The data processing device of claim 18, wherein the measured one or more image criteria comprises at least a sharpness.

22. The data processing device of claim 18, wherein the measured one or more image criteria comprises exposure, color and saturation.

23. The data processing device of claim 18, wherein the instructions to generate the corrected reference image comprises instructions to form a difference image based on the one or more differences between the reference image and the HDR output image, blur the difference image to form a blurred difference image, and combine the blurred difference image and the reference image to generate the corrected reference image.

24. The data processing device of claim 18, wherein the instructions to generate the corrected reference image comprises instructions to blur the reference image to form a blurred reference image, blur the HDR output image to form a blurred HDR output image, determine one or more differences between the blurred reference image and the blurred HDR output image to form a difference image, and combine the difference image and the reference image to generate the corrected reference image.

25. A machine readable non-transitory storage medium containing executable program instructions which cause a data processing device to image processing, the executable program instructions comprising instructions to:

receive a plurality of input images each of which includes at least one moving object that changes relative position from one image to another image in the plurality of input images;

generate a motion mask for the plurality of input images, the motion mask comprising at least one component, wherein a component defines an area in all of the plurality of input images where a moving object is present in any of the plurality of input images;

determine an image quality score for the at least one component in each of the plurality of input images, wherein the image quality score is an overall score based on measured one or more image criteria within a single component;

select a reference image from the plurality of input images for the at least one component based on the image quality score;

create a high dynamic range (HDR) output image based on a merging of the plurality of input images, wherein creating the HDR output image includes replacing the at least one component in the HDR output image with the at least one component in the reference image;

after creation of the HDR output image, determine one or more differences between the reference image and the HDR output image;

generate a corrected reference image based on the one or more differences between the reference image and the HDR output image; and create a corrected HDR output image based on the corrected reference image.

26. The machine readable non-transitory storage medium of claim 25, wherein the measured one or more image criteria comprises at least a color.

27. The machine readable non-transitory storage medium of claim 25, wherein the measured one or more image criteria comprises at least a saturation.

28. The machine readable non-transitory storage medium of claim 25, wherein the measured one or more image criteria comprises at least a sharpness.

29. The machine readable non-transitory storage medium of claim 25, wherein the measured one or more image criteria comprises exposure, color and saturation.

30. The machine readable non-transitory storage medium of claim 25, wherein the instructions to generate the corrected reference image comprises forming a difference image based on the one or more differences between the reference image and the HDR output image, blur the difference image to form a blurred difference image, and combine the blurred difference image and the reference image to generate the corrected reference image.

31. The machine readable non-transitory storage medium of claim 25, wherein the instructions to generate the corrected reference image comprises instructions to blur the reference image to form a blurred reference image, blur the HDR output image to form a blurred HDR output image, determine one or more differences between the blurred reference image and the blurred HDR output image to form a difference image, and combine the difference image and the reference image to generate the corrected reference image.

32. The machine-implemented method of claim 1, wherein the plurality of input images includes two moving objects and wherein the motion mask comprises two components, each component defining a different area in all of the plurality of input images where the moving objects are present in any of the plurality of input images, and wherein different reference images are selected from the plurality of input images for each component.

33. The apparatus of claim 10, wherein the plurality of input images includes two moving objects and wherein the motion mask comprises two components, each component defining a different area in all of the plurality of input images where the moving objects are present in any of the plurality of input images, and wherein the means for selecting the reference image selects different reference images from the plurality of input images for each component.

34. The data processing device of claim 18, wherein the plurality of input images includes two moving objects and wherein the motion mask comprises two components, each component defining a different area in all of the plurality of input images where the moving objects are present in any of the plurality of input images, and wherein the instructions that cause the processor to select the reference image further cause the processor to select different reference images from the plurality of input images for each component.

35. The machine readable non-transitory storage medium of claim 25, wherein the plurality of input images includes two moving objects and wherein the motion mask comprises two components, each component defining a different area in all of the plurality of input images where the moving objects are present in any of the plurality of input images, and wherein the instructions to select the reference image comprises instructions to select different reference images from the plurality of input images for each component.

* * * * *